(12) United States Patent
Yanagisawa

(10) Patent No.: US 8,634,683 B2
(45) Date of Patent: Jan. 21, 2014

(54) OPTICAL WAVEGUIDE DEVICE AND METHOD OF MANUFACTURING THE SAME

(75) Inventor: Kenji Yanagisawa, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 123 days.

(21) Appl. No.: 13/095,068

(22) Filed: Apr. 27, 2011

(65) Prior Publication Data

US 2011/0286692 A1 Nov. 24, 2011

(30) Foreign Application Priority Data

May 21, 2010 (JP) .................... 2010-116920

(51) Int. Cl.
*G02B 6/12* (2006.01)
*G02B 6/10* (2006.01)

(52) U.S. Cl.
USPC .............................. 385/14; 385/31; 385/129

(58) Field of Classification Search
USPC ............... 385/14, 31, 33, 129, 130–132
See application file for complete search history.

(56) References Cited

U.S. PATENT DOCUMENTS

| | | | |
|---|---|---|---|
| 7,330,612 B2 * | 2/2008 | Nakashiba et al. | 385/14 |
| 7,734,124 B2 | 6/2010 | Yonekura et al. | |
| 2006/0110114 A1 * | 5/2006 | Yanagisawa et al. | 385/129 |

FOREIGN PATENT DOCUMENTS

| | | |
|---|---|---|
| JP | 11-183761 | 7/1999 |
| JP | 2005-164762 | 6/2005 |
| JP | 2006-119216 A1 | 5/2006 |
| JP | 2008-281816 | 11/2008 |
| JP | 2009-180861 | 8/2009 |

OTHER PUBLICATIONS

Notice of Reason for Refusal mailed Jul. 23, 2013 from the Japanese Patent Office in counterpart application No. 2010-116920 with English translation.

* cited by examiner

*Primary Examiner* — K. Cyrus Kianni
*Assistant Examiner* — Hung Lam
(74) *Attorney, Agent, or Firm* — Kratz, Quintos & Hanson, LLP

(57) ABSTRACT

A method of manufacturing an optical waveguide device, includes obtaining an optical waveguide by forming sequentially a first cladding layer, a core layer, and a second cladding layer on a substrate, forming a groove portion including a light path conversion inclined surface and a sidewall surface which intersects with it, and the groove portion dividing the second cladding layer and the core layer, on both end sides of the optical waveguide respectively, forming selectively a metal layer on the light path conversion inclined surface and the sidewall surface of the groove portion, forming a protection insulating layer sealing the metal layer on the optical waveguide, and obtaining a light path conversion mirror that the metal layer is formed on the light path conversion inclined surface, by forming a concave portion which penetrates the core layer from the protection insulating layer to remove the metal layer formed on the sidewall surface of the groove portion.

13 Claims, 10 Drawing Sheets

(fragmental plan view)

(fragmental plan view)

(fragmental plan view)

OPTICAL WAVEGUIDE DEVICE AND METHOD OF MANUFACTURING THE SAME

CROSS-REFERENCE TO RELATED APPLICATIONS

This application is based upon and claims the benefit of priority of the prior Japanese Patent Application No. 2010-116920, filed on May 21, 2010, the entire contents of which are incorporated herein by reference.

FIELD

It is related to an optical waveguide device and a method of manufacturing the same.

BACKGROUND

Recently, the development of the backbone network communication line as mainly focusing on the optical fiber communication technology is proceeding steadily, in such a situation, the electronic wirings in the information terminal are becoming a bottleneck. Against such background, instead of the conventional electric circuit substrate in which all signal transmissions are made by using the electric signal, the optoelectronic composite substrate (the optical waveguide device) of the type that transmits high-speed parts by the light has been proposed, in order to compensate the limit of transmission speed of the electric signal.

In the optoelectronic composite substrate, the light signal is transmitted by the optical waveguide including such a structure in which the core layer is surrounded by the cladding layers.

In Patent Literature 1 (Japanese Laid-Open Patent Publication No.2006-119216), it is set forth that the lower cladding layer, the core layer, and the upper cladding layer are formed sequentially on the substrate, then the first and second groove portions which divide the core layer from the upper cladding layer side are formed, and then the first and second mirrors are formed by providing the metal film on the first and second groove portions.

As explained in the related art described later, in the method of forming the light path conversion mirror which is optically coupled to the optical waveguide, first, the groove portion which includes the light path conversion inclined surface arranged on the outer side and the sidewall surface (the perpendicular surface) which intersects with the light path conversion inclined surface is formed on both end sides of the optical waveguide respectively. Then, the metal layer is formed selectively on the inner surfaces of the groove portions, and then the unnecessary metal layer formed on the sidewall surfaces is removed, whereby the light path conversion mirror formed of the metal layer is obtained on the light path conversion inclined surface.

However, the micro fabrication is necessary in order to remove the metal layer on the sidewall surfaces of the groove portions. Therefore, there is necessity to specially employ the laser beam machining using an excimer laser or the high-performance photolithography. As a result, such a problem arises that an increase in cost is brought about.

Also, there is the method of removing the metal layer by cutting the metal layer on the sidewall surface of the groove portion by means of the cutting device. In this event, such a problem arises that either the cutting shavings adhere to the metal layer (the light path conversion mirror) of the light path conversion inclined surface, or the metal layer peels off or deforms.

SUMMARY

According to one aspect discussed herein, there is provided a method of manufacturing an optical waveguide device, which includes obtaining an optical waveguide by forming sequentially a first cladding layer, a core layer, and a second cladding layer on a substrate, forming a groove portion including a light path conversion inclined surface and a sidewall surface which intersects with the light path conversion inclined surface, and the groove portion dividing the second cladding layer and the core layer, on both end sides of the optical waveguide respectively, forming selectively a metal layer on the light path conversion inclined surface and the sidewall surface of the groove portion, forming a protection insulating layer sealing the metal layer on the optical waveguide, and obtaining a light path conversion mirror that the metal layer is formed on the light path conversion inclined surface, by forming a concave portion which penetrates the core layer from the protection insulating layer to remove the metal layer formed on the sidewall surface of the groove portion.

According to another aspect discussed herein, there is provided an optical waveguide device, which includes a substrate, an optical waveguide in which a first cladding layer, a core layer, and a second cladding layer are laminated sequentially on the substrate, a light path conversion mirror provided to oppose such that the light path conversion mirror makes a predetermined angle to the optical waveguide, and a concave portion provided to penetrate the core layer from an upper surface side of the optical waveguide, such that an end portion of the light path conversion mirror is exposed from the first cladding layer in the concave portion.

DESCRIPTION OF EMBODIMENTS

Embodiments of the present invention will be explained with reference to the accompanying drawings hereinafter.

(Related Art)

Prior to the explanation of the embodiments, in the related art associated with the embodiments, a problem caused when a light path conversion mirror is formed in an optical waveguide will be explained hereunder.

In the optical waveguide device, in the case that the light emitting element and the light receiving element both of which are of the surface-mounting type are connected to the optical waveguide, the groove portion including the light path conversion inclined surface which is inclined to intersect with the light propagation direction at an angle of 45° is formed on both end sides of the optical waveguide, and then the light path conversion mirror is provided on the light path conversion inclined surface, whereby a light path conversion is performed.

FIGS. 1A to 1C and FIGS. 2A and 2B are sectional views depicting a method of forming a light path conversion mirror in an optical waveguide in the related art. In FIGS. 1A to 1C and FIGS. 2A and 2B, one end side of the optical waveguide is depicted fragmentally.

Figure 1A:
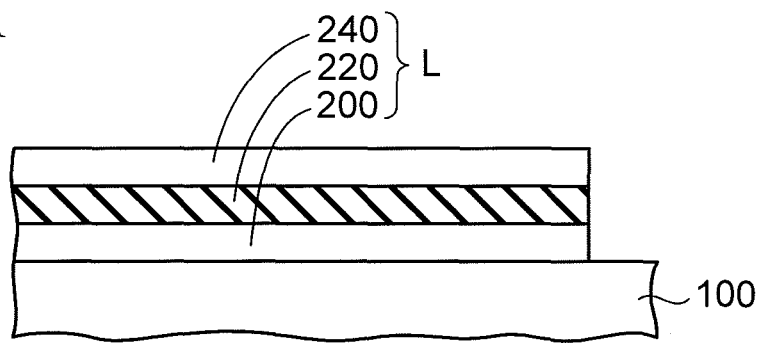
FIGS. 1A to 1C are sectional views (#1) depicting a method of forming a light path conversion mirror in an optical waveguide in the related art.

As depicted in FIG. 1A, first, a first cladding layer 200 is formed on a wiring substrate 100, and then a core layer 220 which extends like a belt in the lateral direction is formed on the first cladding layer 200. Then, a second cladding layer 240 covering the core layer 220 is formed. Accordingly, an optical waveguide L including such a structure in which the core layer 220 is surrounded by the first cladding layer 200 and the second cladding layer 240 is obtained.

Figure 1B:
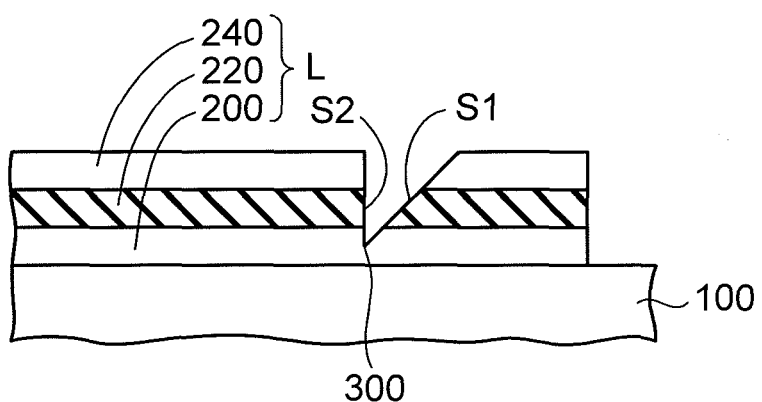

Then, as depicted in FIG. 1B, the structure body in FIG. 1 is cut from an upper surface of the second cladding layer 240 to a halfway position of the thickness of the first cladding layer 200 so as to penetrate the core layer 220. Thus, a groove portion 300 including a light path conversion inclined surface S1, and a sidewall surface S2 (a perpendicular surface) is formed.

Figure 1C:
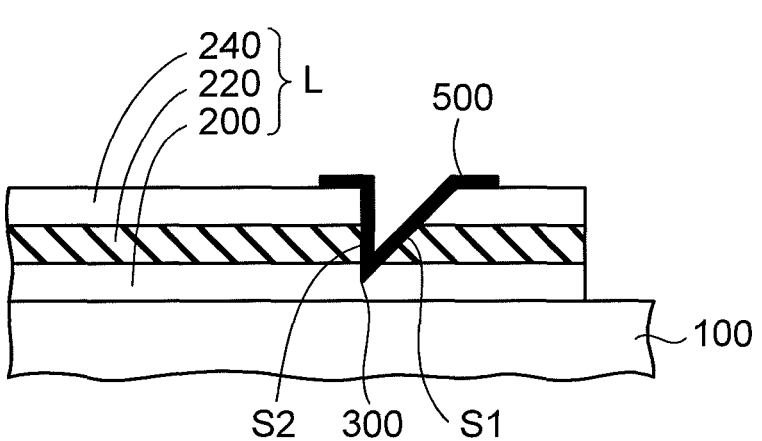

Then, as depicted in FIG. 1C, a metal layer 500 is formed selectively on the light path conversion inclined surface S1 and the sidewall surface S2 of the groove portion 300 and their vicinity through an opening portion of a mask (not shown) by the vapor deposition.

In the optical waveguide L, a light path is converted at 90° by the metal layer 500 (the light path conversion mirror) which is formed on the light path conversion inclined surface S1 of the groove portion 300. In a state in FIG. 1C, the metal layer 500 still remains on the sidewall surface S2 of the groove portion 300, and therefore the light propagation is blocked and thus the light path conversion cannot be performed.

Figure 2A:
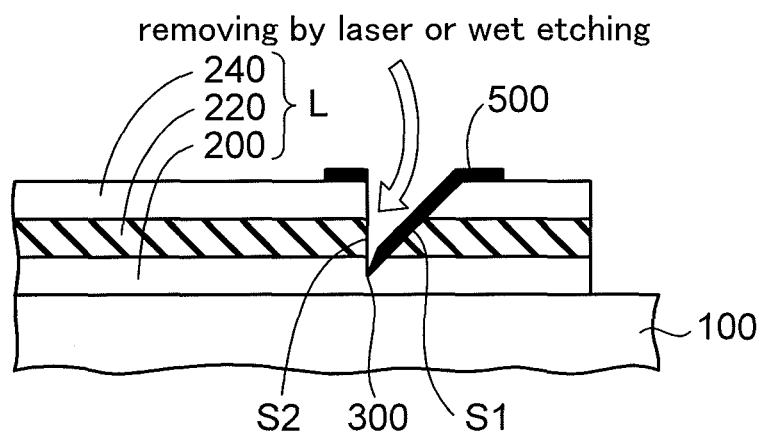
FIGS. 2A and 2B are sectional views (#2) depicting the method of forming the light path conversion mirror in the optical waveguide in the related art.

Therefore, as depicted in FIG. 2A, it is necessary to remove selectively the metal layer 500 on the sidewall surface S2 of the groove portion 300. As the method of removing selectively the metal layer 500 on the sidewall surface S2 of the groove portion 300, the method using the laser processing, the method of removing by the wet etching, or the like may be employed.

However, a width of the groove portion 300 is relatively narrowed because the optical waveguide L is formed of a thin film (thickness: 50 to 100 μm).

For this reason, the micro fabrication technology is needed in order to remove selectively the metal layer 500 on the sidewall surface S2 of the groove portion 300.

Therefore, in the case that the laser is employed, it is necessary to employ the excimer laser that enable the micro fabrication, or the like is needed specially, and thus such a problem arises that an increase in cost is brought about.

Also, in the case that the wet etching is employed, it is necessary to pattern a resist mask on the light path conversion inclined surface S1 of the groove portion 300 with good precision. Therefore, a high-precision photomask and the high-performance exposure equipment are needed. In this case, such a problem also arises that an increase in cost is brought about.

Figure 2B:
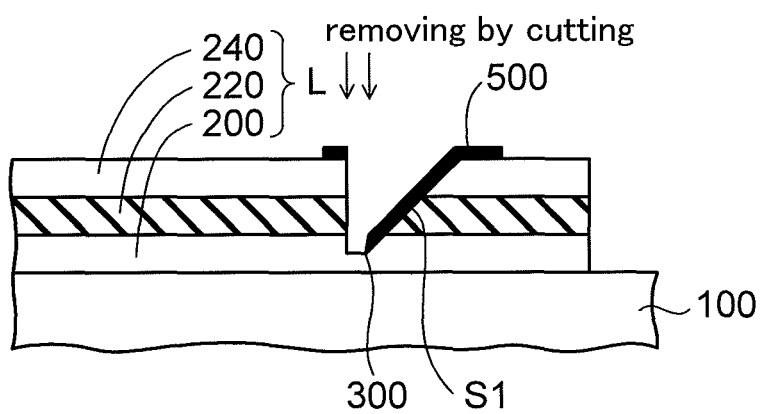

Otherwise, as depicted in FIG. 2B, in addition to the laser processing or the wet etching, there is the method of removing the metal layer 500 by cutting the metal layer 500 on the sidewall surface S2 of the groove portion 300 toward the thickness direction of the optical waveguide L by using the rotary blade of the cutting device (the dicing saw).

At this time, the cutting is performed in a condition that the metal layer 500 (the light path conversion mirror) formed on the light path conversion inclined surface S1 of the groove portion 300 is exposed. Therefore, such a problem arises that the cutting shavings adhere to the metal layer 500 (the light path conversion mirror) of the light path conversion inclined surface S1 of the groove portion 300, or the metal layer 500 peels off or deforms due to the cutting damage. As a result, such a problem still remains that the light path conversion mirror cannot be constructed with good yield.

In this case, also in the case that the groove portion is formed in the core layer 220 and the first cladding layer 200 before the second cladding layer 240 is formed and then the light path conversion mirror is formed by the similar method, the similar problem arises.

Respective embodiments explained hereinafter can overcome the drawbacks discussed above.

(First Embodiment)

Figure 5A:
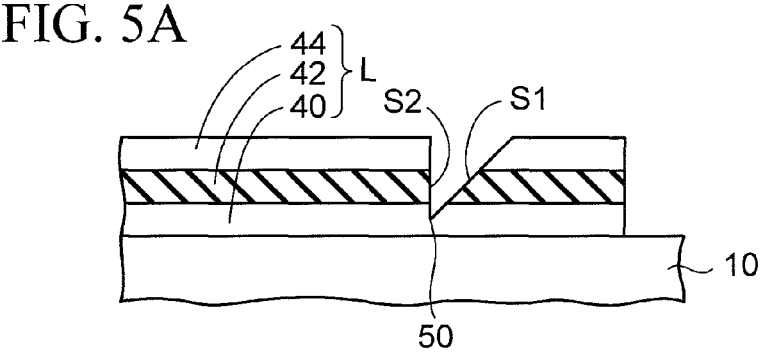
FIGS. 5A to 5C are sectional views (#3) depicting the method of manufacturing the optical waveguide device according to the first embodiment.
Figure 5B:
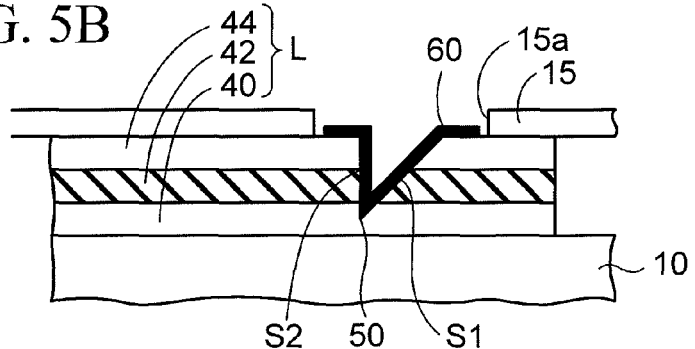
Figure 5C:
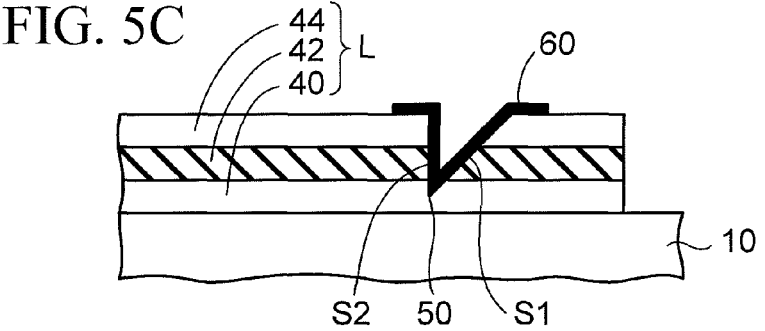
Figure 6A:
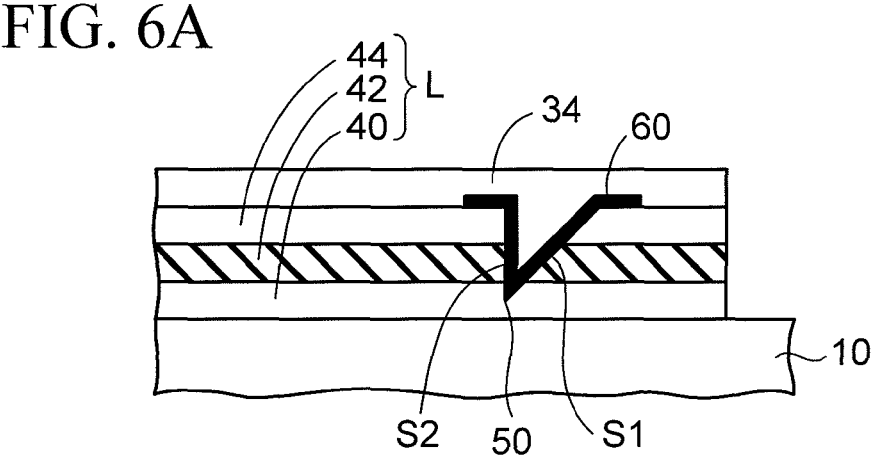
FIGS. 6A to 6C are sectional views (#4) depicting the method of manufacturing the optical waveguide device according to the first embodiment.
Figure 6B:
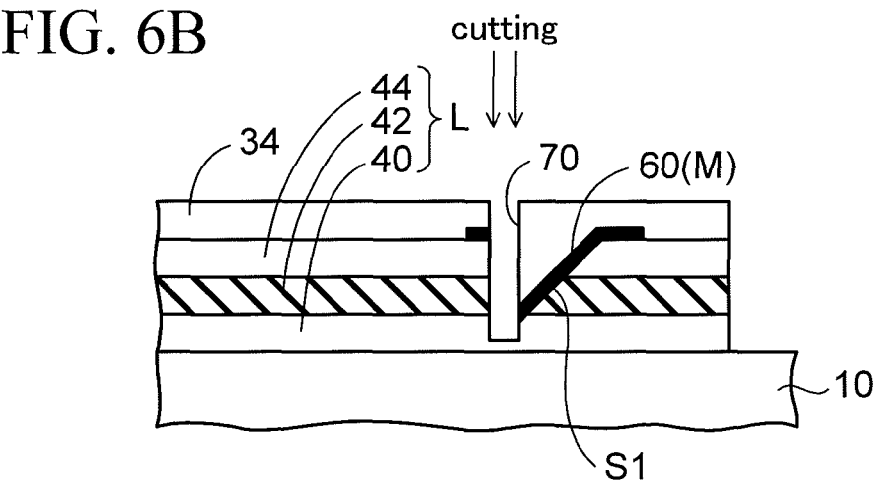
Figure 6C:
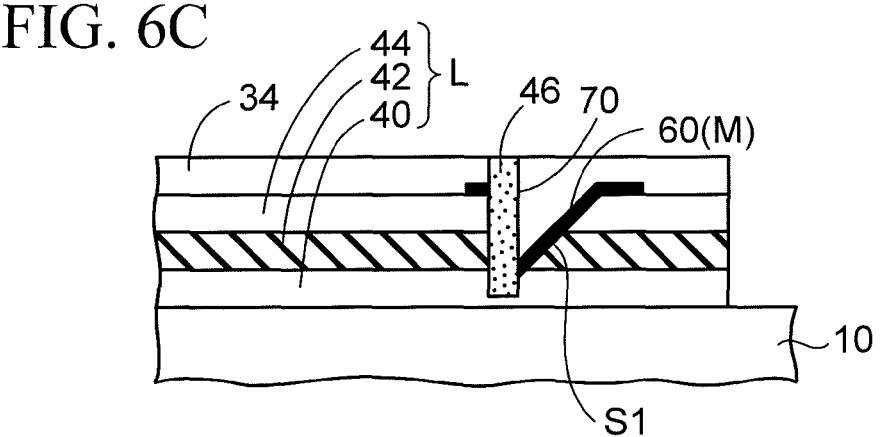
Figure 7:
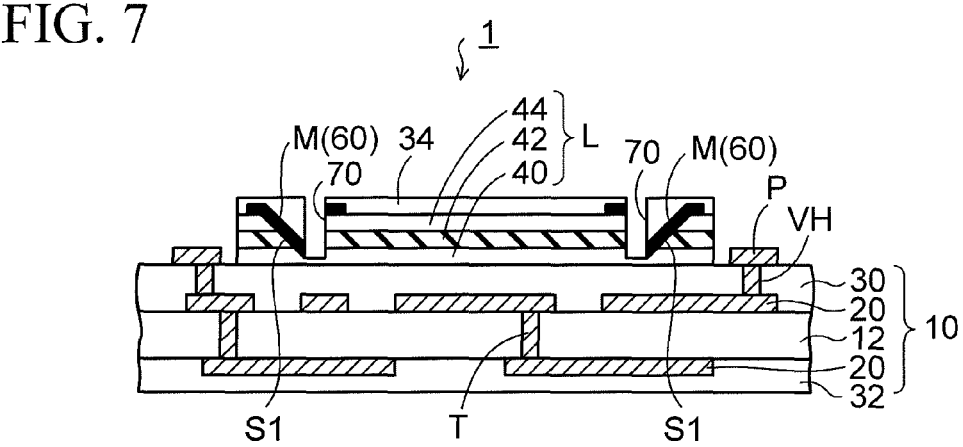
FIG. 7 is a sectional view depicting an optical waveguide device according to the first embodiment.
Figure 8:
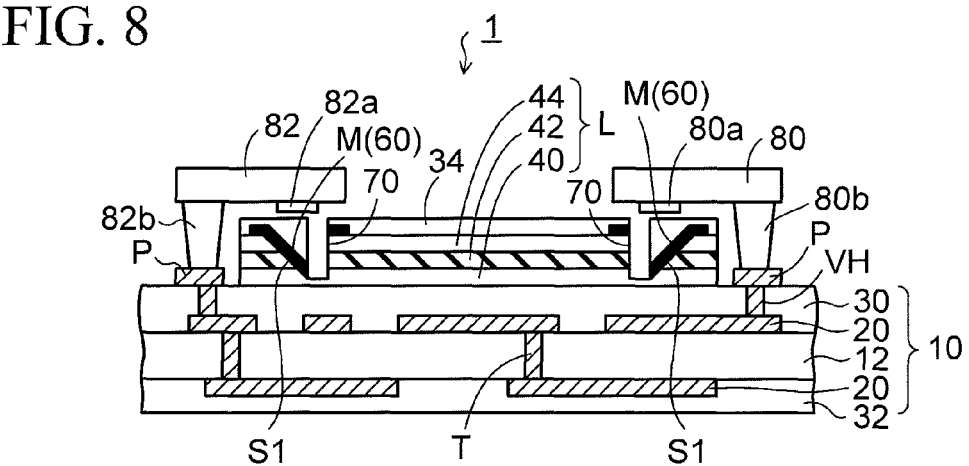
FIG. 8 is a sectional view and a plan view depicting the optical waveguide device in FIG. 7 on which a light emitting element and a light receiving element are mounted, according to the first embodiment.
Figure 8:
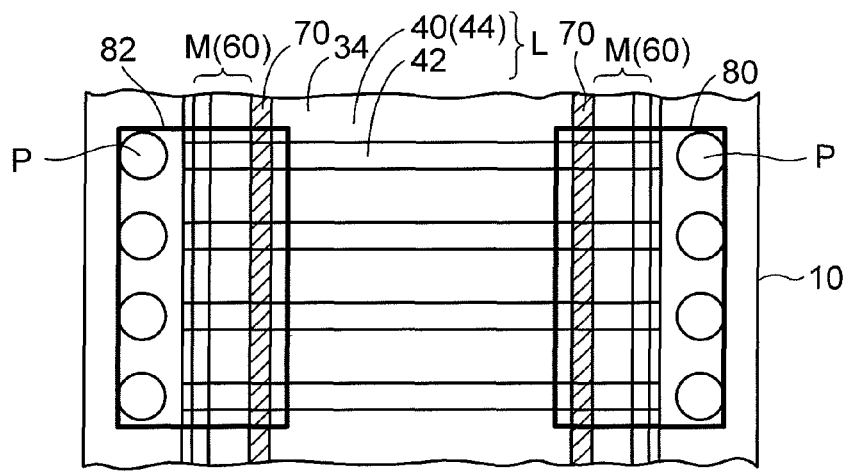
Figure 9:
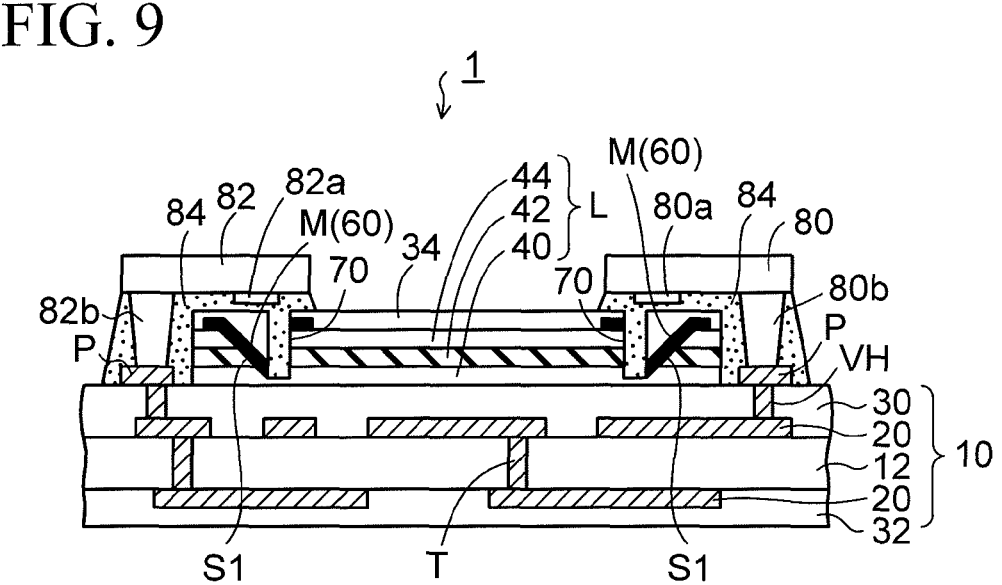
FIG. 9 is a sectional view depicting a state that an underfill resin is filled under the light emitting element and the light receiving element of the optical waveguide device in FIG. 8.

FIG. 3A to FIG. 6C are sectional views depicting a method of manufacturing an optical waveguide device according to a first embodiment, and FIG. 7 to FIG. 9 are sectional views depicting an optical waveguide device according to the first embodiment.

Figure 3A:
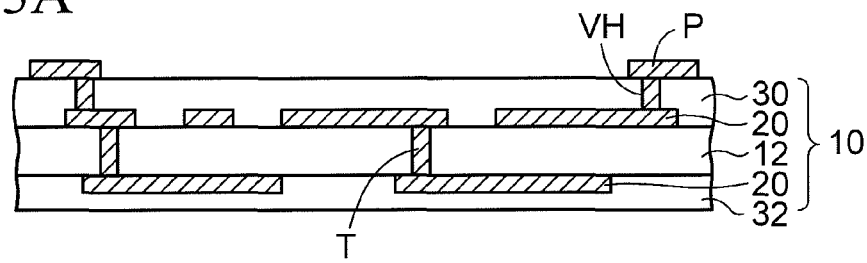
FIGS. 3A to 3C are sectional views (partially a plan view) (#1) depicting a method of manufacturing an optical waveguide device according to a first embodiment.

In the method of manufacturing the optical waveguide device according to the first embodiment, first, a wiring substrate 10 depicted in FIG. 3A is prepared. In the wiring substrate 10 depicted in FIG. 3A, a core substrate 12 is arranged in a center part in the thickness direction. Also, penetration electrodes T are provided in the core substrate 12, and wiring layers 20 connected mutually via the penetration electrode T are formed on both surface sides of the core substrate 12 respectively.

An interlayer insulating layer 30 covering the wiring layers 20 is formed on the upper surface side of the core substrate 12. Also, a solder resist 32 covering the wiring layers 20 is formed on the lower surface side of the core substrate 12.

Via holes VH each having a depth that reaches the wiring layer 20 are formed in the interlayer insulating layer 30.

Also, connection pads P each connected to the wiring layer 20 via the via hole VH (the embedded via conductor) are formed on the interlayer insulating layer 30. The wiring layers 20 of the wiring substrate 10 and the connection pads P connected to these wiring layers function as the electric wirings.

Figure 3B:
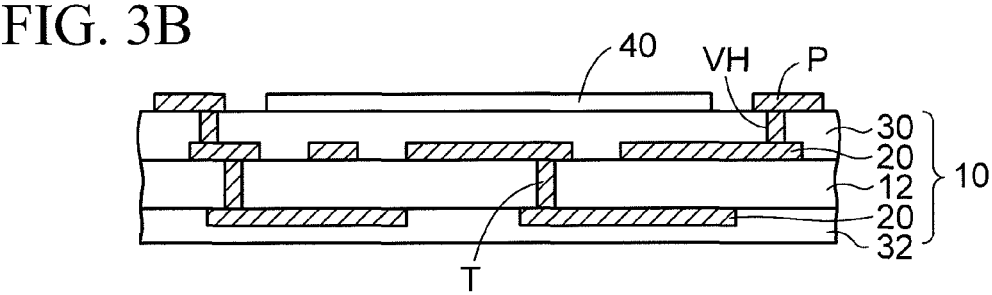

Then, as depicted in FIG. 3B, a photosensitive resin layer (not shown) for obtaining a first cladding layer is formed on the upper surface side of the wiring substrate 10, then the exposure/development is applied based on the photolithography, and then the photosensitive resin layer is cured by applying a heat treatment at about 150° C. Accordingly, a first cladding layer 40 is formed in the area between the connection pads P on the wiring substrate 10 as a lump pattern. A thickness of the first cladding layer 40 is about 10 µm.

As the method of forming the photosensitive resin layer for obtaining the first cladding layer 40, a liquid photosensitive resin may be coated or a photosensitive resin in a semi-cured state may be pasted. As the photosensitive resin, a UV-curable epoxy resin, or the like is preferably employed. This is also similar in the steps of forming the core layer and the second cladding layer, described later.

Figure 3C:
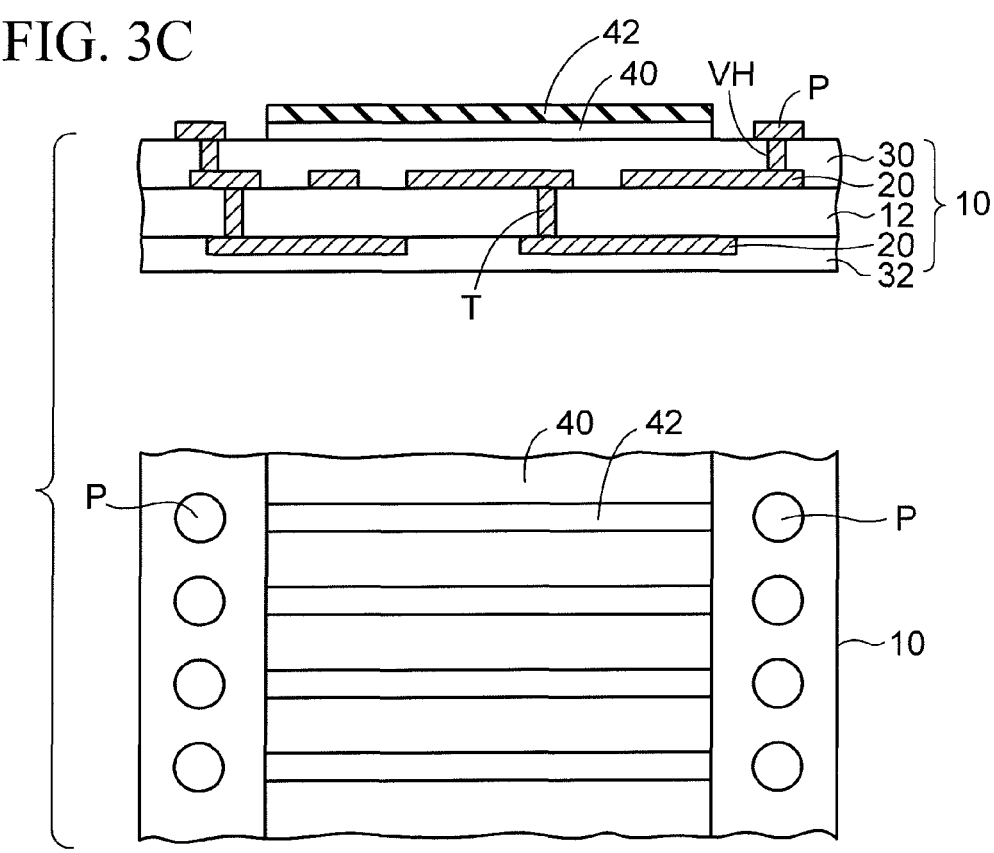

Then, as depicted in FIG. 3C, a photosensitive resin layer (not shown) for obtaining core layers is formed on the first cladding layer 40 and the connection pads P on the upper surface side of the wiring substrate 10. Then, the exposure/development is applied based on the photolithography, and then the photosensitive resin layer is cured by applying a heat treatment at about 150° C., so that core layers 42 are obtained.

As depicted in a fragmental plan view of FIG. 3C, the first cladding layer 40 is arranged in the areas between a plurality of opposing connection pads P, and the belt-like core layers 42 which extend in the lateral direction are arranged side by side in the longitudinal direction on the first cladding layer 40. A refractive index of the core layer 42 is set higher than a refractive index of the first cladding layer 40 and a second cladding layer described later.

A thickness of the core layer 42 is about 30 to 80 µm, and a pattern width of the core layer 42 is about 400 µm.

Figure 4:
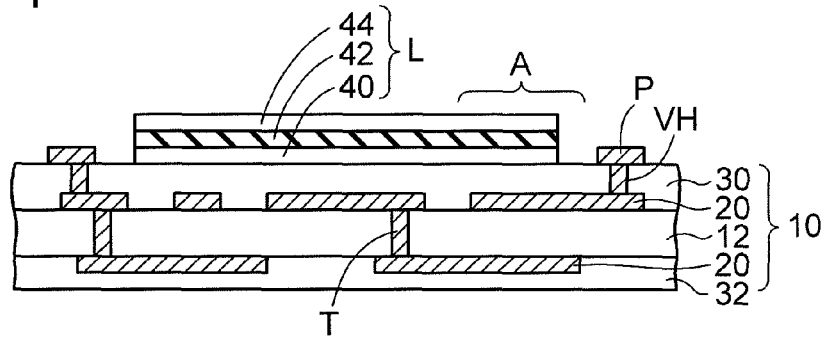
FIG. 4 is a sectional view (#2) depicting the method of manufacturing the optical waveguide device according to the first embodiment.

Then, as depicted in FIG. 4, a photosensitive resin layer (not shown) for obtaining a second cladding layer is formed on the core layers 42 and the connection pads P on the upper surface side of the wiring substrate 10. Then, the exposure/development is applied based on the photolithography, and then the photosensitive resin layer is cured by applying a heat treatment at about 150° C., so that a second cladding layer 44 covering the core layers 42 is obtained.

Accordingly, the optical waveguide L including such a structure in which the core layers 42 are surrounded by the first cladding layer 40 and the second cladding layer 44 is obtained on the wiring substrate 10.

Next, a method of forming the light path conversion mirror in both end sides of the optical waveguide L will be explained hereunder. The light path conversion mirror is formed on both end sides of the optical waveguide L. In this event, in FIGS. 5A to 5C and FIGS. 6A to 6C described later, a state of one end side of the optical waveguide L (an area indicated by A) in FIG. 4 is fragmentarily depicted and explained hereinafter.

As depicted in FIG. 5A, the parts in which the light path conversion mirror is arranged and which are located on both end sides of the optical waveguide L are cut by the rotary blade of the cutting device toward the thickness direction. Accordingly, a groove portion 50 which has a light path conversion inclined surface S1 for converting a light path at 90°, and a sidewall surface S2 which intersects with the light path conversion inclined surface S1, is formed on both end sides of the optical waveguide L respectively.

In each groove portion 50 formed on both end sides of the optical waveguide L, the light path conversion inclined surface S1 is arranged on the outer side and the sidewall surface S2 is arranged on the inner side. The sidewall surface S2 of the groove portion 50 is formed as a perpendicular surface which intersects orthogonally with the extending direction of the optical waveguide L, and the groove portion 50 is formed such that a sectional shape has a right triangle.

Besides the cutting process, the groove portion 50 can be formed by processing the optical waveguide L by means of various processing means.

The groove portion 50 is formed from an upper surface of the second cladding layer 44 to a halfway position of thickness of the first cladding layer 40 so as to penetrate the core layers 42. And the groove portion 50 is formed such that the second cladding layer 44 and the core layers 42 are separated mutually. The groove portion 50 is formed as a belt-like groove which intersects orthogonally with a plurality of core layers 42.

In this case, the sidewall surface S2 of the groove portion 50 is not always formed as the perpendicular surface. An inclined surface which is inclined a little toward the inner side of the optical waveguide L may be employed as the sidewall surface S2.

Then, as depicted in FIG. 5B, a mask 15 having an opening portion 15a that corresponds to the groove portion 50 and its vicinity is prepared. Then, the mask 15 is arranged on the optical waveguide L such that the groove portion 50 is exposed from the opening portion 15a.

Then, a metal layer 60 is formed selectively on the groove portion 50 and its vicinity by the vapor deposition through the opening portion 15a of the mask 15. As the metal layer 60, a gold (Au) layer, an aluminum (Al) layer, or the like, which has a good light reflectance, may be employed.

After this, the mask 15 is removed from the optical waveguide L. Accordingly, as depicted in FIG. 5C, the metal layer 60 is formed selectively on the light path conversion inclined surface S1 and the sidewall surface S2 in the groove portion 50 and the second cladding layer 44 in the vicinity of the groove portion 50.

Then, as depicted in FIG. 6A, a protection insulating layer 34 is formed on the second cladding layer 44 so as to bury the groove portion 50 and the metal layer 60. The protection insulating layer 34 is formed of the identical resin with the first and second cladding layers 40, 44 and the core layer 42. Accordingly, such a situation is obtained that the metal layer 60 formed on the inner surface of the groove portion 50 is sealed and protected by the protection insulating layer 34.

Then, as depicted in FIG. 6B, respective parts of the protection insulating layer 34 and the optical waveguide L, which correspond to the sidewall surface S2 of the groove portion 50 and its vicinity, are cut and processed in the depth direction by the rotary blade of the cutting device. Thus, the metal layer 60 formed on the sidewall surface S2 of the groove portion 50 is removed. As the cutting device, the dicing saw used to cut the substrate (the wafer) is preferably employed.

As a result, a perpendicular concave portion 70 is formed in respective parts which correspond to the sidewall surface S2 of the groove portion 50 and its vicinity. This concave portion 70 is formed to penetrate the protection insulating layer 34, the second cladding layer 44, and the core layer 42 and reach a halfway position of thickness of the first cladding layer 40.

Thus, in the lower part of the outer side surface (the side surface of the light path conversion mirror formation side) of the concave portion 70, the inner end part of the metal layer 60 (the end part positioned on the light propagation side) on the light path conversion inclined surface S1 is exposed from the first cladding layer 40. That is, the inner end part of the metal layer 60 on the light path conversion inclined surface S1 contacts the lower part of the outer side surface of the concave portion 70. The concave portion 70 is formed like a belt along the sidewall surface S2 of the groove portion 50.

At this time, the metal layer 60 formed on the light path conversion inclined surface S1 of the groove portion 50 is sealed with the protection insulating layer 34. Therefore, such a drawback can be overcome that either the cutting shavings adhere to the metal layer 60 (the light path conversion mirror) of the light path conversion inclined surface S1, or the metal layer 60 peels off or deforms.

In this case, instead of the cutting device, the protection insulating layer 34 and the optical waveguide L may be processed in the thickness direction by the excimer laser, and thus the metal layer 60 on the sidewall surface S2 of the groove portion 50 may be removed.

For example, a thickness of the metal layer 60 is 0.2 to 0.5 μm, a width of the concave portion 70 is set to 10 to 20 μm, and as a result the metal layer 60 on the sidewall surface S2 of the groove portion 50 can be removed without fail.

In this manner, the unnecessary metal layer formed on the sidewall surface S2 of the groove portion 50 is removed, so that a light can be emit from both end surfaces of the core layer 42. Therefore, the metal layer 60 on the light path conversion inclined surface S1 can be made to function as the light path conversion mirror M.

Here, in the case that the sidewall surface S2 of the groove portion 50 is formed as an inclined surface which is inclined to the inner side of the optical waveguide L, the part corresponding to a width of the inclined surface is cut similarly and removed.

Also, the concave portion 70 is formed up to a halfway position of thickness of the first cladding layer 40, and thus there is no fear that the underlying wiring layer 20, etc. of the wiring substrate 10 are damaged. Therefore, the light path conversion mirror M constructed as above can be formed without considering the wiring substrate 10.

As depicted in FIG. 6B, the concave portion may be formed as a cavity. In this case, the light which is propagated between the core layer 42 and the light path conversion mirrors M propagates through an air in the concave portion 70. In such a situation, the core layer 42 and the light path conversion mirrors M can be optically coupled mutually without an enormous optical loss.

Also, because the concave portion 70 is formed in the perpendicular direction, the side surfaces of the concave portion 70 constitute the perpendicular surface. Therefore, even when the inside of the concave portion 70 is the cavity, the light can be propagated not to cause an optical loss.

Otherwise, as depicted in FIG. 6C, as the need arises, an embedded resin 46 may be embedded in the concave portion 70. It is preferable that the embedded resin 46 should be formed of the identical resin with the core layer 42 or the first and second cladding layers 40, 44.

In particular, when the embedded resin 46 is formed of the identical resin with the core layer 42, a refractive index of the embedded resin 46 is set equally to the core layer 42. Therefore, the good optical coupling can be achieved.

According to the above method, as depicted in FIG. 7, the light path conversion mirror M which is inclined to intersect with the extending direction of the core layer 42 (the light propagation direction) at a predetermined angle (preferably, 45°) is formed on both end sides of the optical waveguide L formed on the wiring substrate 10, respectively.

In this manner, the general dicing technology is used without using the laser processing by the excimer laser or the high-precision photolithography technology which brings out an increase in cost. By using this method, the unnecessary metal layer 60 formed on the sidewall surface S2 of the groove portion 50 can be easily removed. As a result, the light path conversion mirror M can be formed on the optical waveguide L at a low cost and with good yield.

With the above, as depicted in FIG. 7, an optical waveguide device 1 of the first embodiment can be obtained.

As depicted in FIG. 7, in the optical waveguide device 1 of the first embodiment, the optical waveguide L including such a structure in which the core layer 42 is surrounded by the first cladding layer 40 and the second cladding layer 44 is formed on the wiring substrate 10 explained in FIG. 3A described above.

The light path conversion inclined surface S1 which is inclined to intersect with the extending direction of the core layer 42 (the light propagation direction) at an angle of 45° is provided in the thickness direction on both end sides of the optical waveguide L respectively. In the first embodiment, the light path conversion inclined surface S1 provided on both sides is formed in the parts from the second cladding layer 44 and the core layer 42 to a halfway position of thickness of the first cladding layer 40. Also, the light path conversion mirror M formed of the light reflective metal layer 60 is formed on the light path conversion inclined surface S1 provided on both end sides of the optical waveguide L, respectively.

The protection insulating layer 34 is formed on the optical waveguide L so as to bury the light path conversion mirror M arranged obliquely. The perpendicular concave portion 70 is formed in the vicinity of the inner end part of the light path conversion mirror M on both end sides of the optical waveguide L respectively. This concave portion 70 is formed to have the depth that penetrates the protection insulating layer 34, the second cladding layer 44 and the core layer 42, and reaches a halfway position of thickness of the first cladding layer 40.

The outer side surfaces of the concave portions 70 (the side surface of the light path conversion mirror formation side) on both sides are arranged respectively in a state that the inner end part of the light path conversion mirror M (the end part positioned on the light propagation side) is exposed from the first cladding layer 40. That is, the concave portions 70 on both sides are arranged respectively in a state that the outer side surface thereof contacts the inner end part of the light path conversion mirror M.

In this fashion, a light path is converted at 90° by the light path conversion mirror M which is arranged on both outer sides of the core layer 42.

As described above, in the method of manufacturing the optical waveguide device of the first embodiment, the optical waveguide L is formed on the wiring substrate 10, and then the groove portion 50 including the light path conversion inclined surface S1 and the sidewall surface S2 is formed on both end sides of the optical waveguide L respectively.

Then, the metal layer 60 having light reflectivity is formed selectively in the groove portion 50 and its vicinity. Then, the protection insulating layer 34 which seals the metal layer 60 of the groove portion 50 is formed. Then, the unnecessary metal layer 60 formed on the sidewall surface S2 of the groove portion 50 is cut in the thickness direction and is removed.

At this time, the metal layer 60 in the groove portion 50 is protected by the protection insulating layer 34. Therefore, such a drawback can be overcome that either the cutting shavings adhere to the metal layer 60 serving as the light path conversion mirror M on the light path conversion inclined surface S1, or the metal layer 60 peels off or deforms.

The optical waveguide device 1 of the first embodiment is manufactured by such manufacturing method. Therefore, the concave portion 70 produced when the unnecessary metal layer 60 on the sidewall surface S2 of the groove portion 50 is removed is formed in vicinity of the inner end parts of the light path conversion mirror M respectively.

As a result, in the optical waveguide device 1 of the first embodiment, the optical waveguide L having the desired light path conversion mirror M is formed at a low cost with good yield.

Next, a method of mounting a light emitting element and a light receiving element on the optical waveguide device 1 in FIG. 7 will be explained hereinafter. As depicted in FIG. 8, a light emitting element 80 and a light receiving element 82 are prepared. As the light emitting element 80, the surface emitting laser (VCSEL: Vertical Cavity Surface Emitting Laser) is preferably employed. Also, as the light receiving element 82, the photodiode is preferably employed.

The light emitting element 80 includes a light emitting portion 80a and connection terminals 80b on the lower surface side. Then, the connection terminals 80b of the light emitting element 80 are connected to the connection pads P on one end side of the optical waveguide device 1 and mounted thereon in a state that the light emitting portion 80a of the light emitting element 80 is directed downward. At this time, the light emitting portion 80a of the light emitting element 80 is arranged right over the light path conversion mirror M. Accordingly, the light emitting element 80 is optically coupled to one end side of the optical waveguide L (the core layer 42) by the light path conversion mirror M.

Also, the light receiving element 82 includes a light receiving portion 82a and connection terminals 82b on the lower surface side. Then, the connection terminals 82b of the light receiving element 82 are connected to the connection pads P on the other end side of the optical waveguide device 1 and mounted thereon in a state that the light receiving portion 82a of the light receiving element 82 is directed downward.

At this time, the light receiving portion 82a of the light receiving element 82 is arranged right over the light path conversion mirror M. Accordingly, the light receiving element 82 is optically coupled to the other end side of the optical waveguide L (the core layer 42) by the light path conversion mirror M.

As depicted in a fragmental plan view in FIG. 8, the light emitting element 80 and the light receiving element 82 are arranged to overlap with the belt-like concave portions 70 (the hatched part) which are arranged to intersect orthogonally with a plurality of core layers 42 respectively.

In the optical waveguide device 1 of the first embodiment, an electric signal which is output from a first LSI chip (CPU, or the like)(not shown) is supplied to the light emitting element 80, and then a light is emitted downward from the light emitting portion 80a of the light emitting element 80. The light emitted from the light emitting element 80 arrives at the light path conversion mirror M on one end side of the optical waveguide L located under the light emitting element 80. Then, the light is reflected by the light path conversion mirror M, and the light path is converted at 90°, and then the light enters into the core layer 42.

Then, the light which enters into the core layer 42 propagates through the core layer 42 while repeating a total reflection therein, and then arrives at the light path conversion mirror M located on the other end side. Then, the light is reflected by the light path conversion mirror M located on the other end side, and the light path is converted at 90°, and then the light enters into the light receiving portion 82a of the light receiving element 82.

The light receiving element 82 converts the light signal into the electric signal, and then the electric signal is supplied to a second LSI chip (a memory, or the like)(not shown).

In this fashion, in the optical waveguide device 1 of the first embodiment, the optical waveguide L having the desired characteristics and the light path conversion mirror M optically coupled to this optical waveguide are provided. Therefore, the light emitting element 80 and the light receiving element 82 both of which are of high performance can be mounted.

Also, as depicted in FIG. 9, an underfill resin 84 may be filled into respective clearances that are located under the light emitting element 80 and the light receiving element 82 (respective space areas to the wiring substrate 10 and the optical waveguide L). At this time, the underfill resin 84 is filled simultaneously in the concave portions 70 which are formed in the protection insulating layer and the optical waveguide L. That is, in the above fragmental plan view of FIG. 8, the underfill resin 84 is filled simultaneously in the belt-like concave portions 70 (the hatched part).

The underfill resin 84 is formed of a transparent resin. Preferably, the identical resin with the core layer 42 or the first and second cladding layers 40, 44 mentioned above is employed.

In this case, after the embedded resin 46 is embedded in the concave portions 70 of the optical waveguide L (FIG. 6C), the light emitting element 80 and the light receiving element 82 may be mounted, and then the underfill resin 84 may be filled as the need arises.

(Second Embodiment)

Figure 10A:
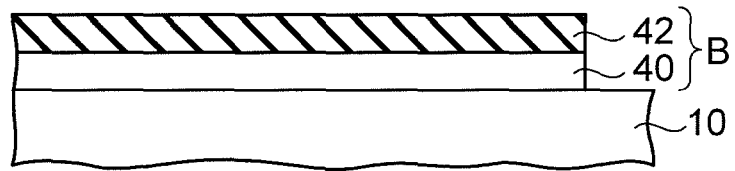
FIGS. 10A to 10D are sectional views (#1) depicting a method of manufacturing an optical waveguide device according to a second embodiment.
Figure 10B:
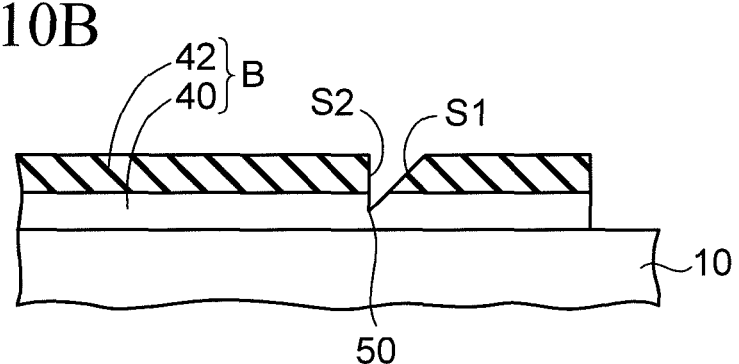
Figure 10C:
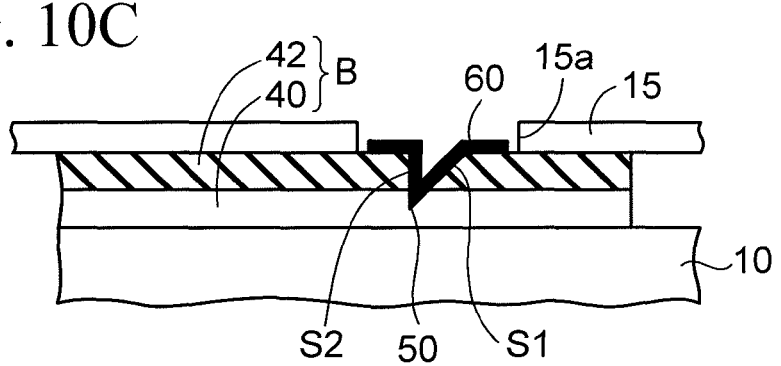
Figure 10D:
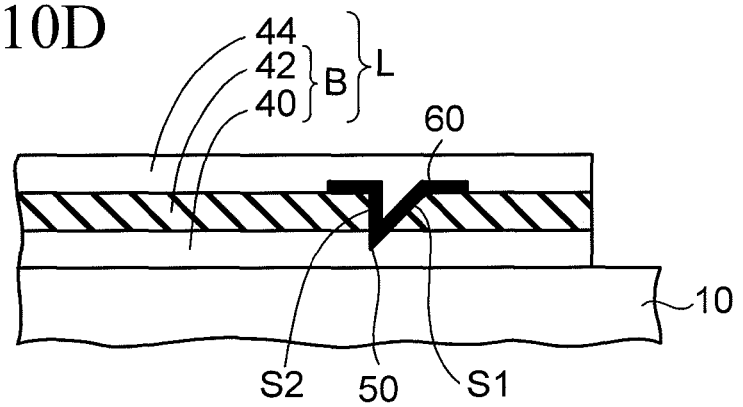
Figure 11A:
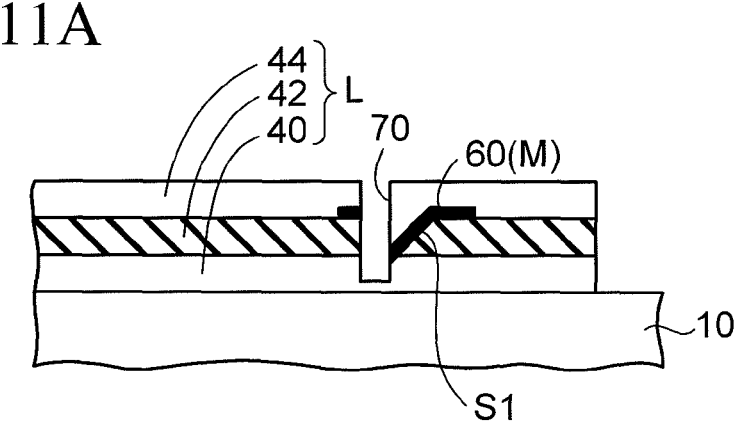
FIGS. 11A and 11B are sectional views (#2) depicting the method of manufacturing the optical waveguide device according to the second embodiment.
Figure 11B:
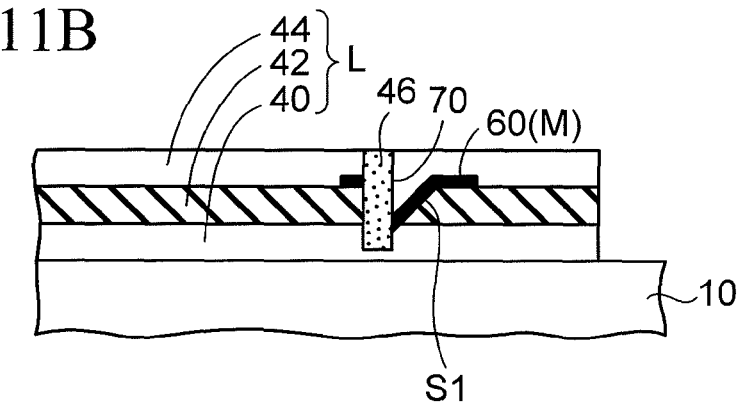
Figure 12:
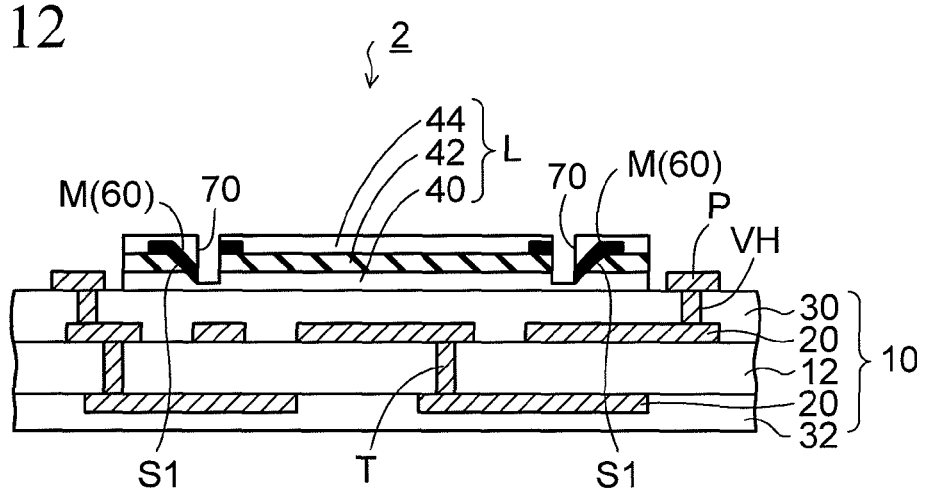
FIG. 12 is a sectional view depicting an optical waveguide device according to the second embodiment.
Figure 13:
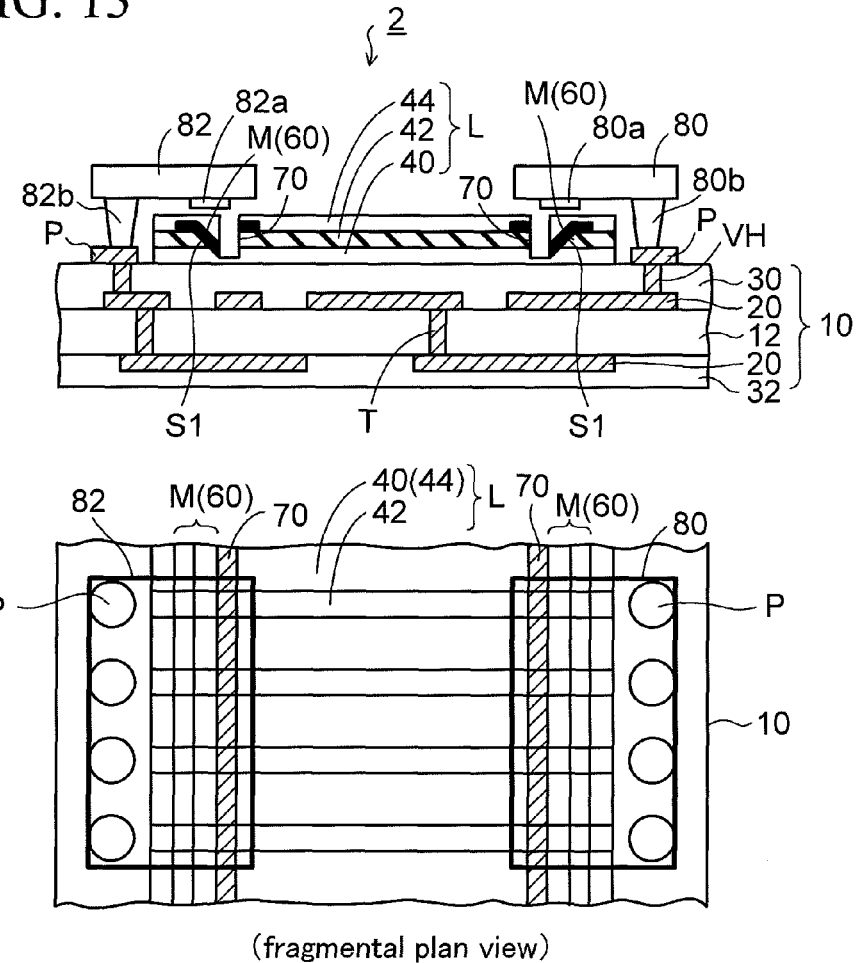
FIG. 13 is a sectional view and a plan view depicting the optical waveguide device on which a light emitting element and a light receiving element are mounted, according to the second embodiment.
Figure 14:
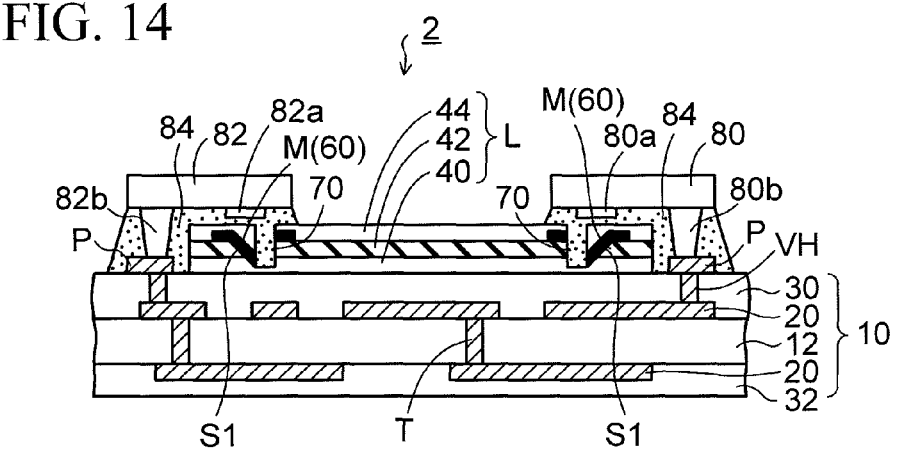
FIG. 14 is a sectional view depicting a state that an underfill resin is filled under the light emitting element and the light receiving element of the optical waveguide device in FIG. 13.

FIGS. 10A to 10D and FIGS. 11A and 11B are sectional views depicting a method of manufacturing an optical waveguide device according to a second embodiment, and FIG. 12 to FIG. 14 are sectional views depicting an optical waveguide device according to the second embodiment.

A different aspect of the second embodiment from the first embodiment resides in that, after the core layer is formed on the first cladding layer, the groove portion and the metal layer are formed, and then the unnecessary metal layer formed on the sidewall surface of the groove portion is removed in a state that the metal layer is sealed with the second cladding layer.

In the second embodiment, the same reference symbols are affixed to the same steps and the same elements as those in the first embodiment, and their detailed explanation will be omitted herein.

In FIGS. 10A to 10D and FIGS. 11A and 11B, like FIGS. 5A to 5C and FIGS. 6A to 6C in the above first embodiment, one end side of the optical waveguide is fragmentarily depicted and explained hereinafter.

In the method of manufacturing the optical waveguide device according to the second embodiment, as depicted in FIG. 10A, first, a laminated body B is obtained by forming sequentially the first cladding layer 40 and the core layer 42 on the wiring substrate 10.

Then, as depicted in FIG. 10B, in both end sides of the laminated body B, the laminated body B is cut from an upper surface of the core layer 42 to a halfway position of thickness of the first cladding layer 40. Thus, the groove portion 50 including the light path conversion inclined surface S1 for converting the light path at 90° and the sidewall surface S2 which intersects with it is formed. The groove portion 50 is formed so as to divide the core layer 42.

In the second embodiment, the sidewall surface S2 of the groove portion 50 should always be formed as the perpendicular surface, and an inclined surface which is inclined a little to the inner side of the optical waveguide L may be employed.

Then, as depicted in FIG. 10C, according to the similar method to the first embodiment, the metal layer 60 is formed selectively on the groove portion 50 and its vicinity through the opening portion 15a of the mask 15 by the vapor deposition.

Then, the mask 15 is removed.

Then, as depicted in FIG. 10D, the second cladding layer 44 is formed on the laminated body B so as to bury the groove portion 50 and the metal layer 60. In the second embodiment, after the core layer 42 is formed, the groove portion 50 and the metal layer 60 are formed. Therefore, the second cladding layer 44 can be made to function as the protection layer which seals the metal layer 60.

Accordingly, the optical waveguide L including such a structure in which the core layer 42 is surrounded by the first cladding layer 40 and the second cladding layer 44 is obtained.

Then, as depicted in FIG. 11A, the part of the optical waveguide L corresponding to the sidewall surface S2 of the groove portion 50 and its vicinity is cut up to a halfway position of thickness of the first cladding layer 40. Thus, the unnecessary metal layer 60 formed on the sidewall surface S2 of the groove portion 50 is removed.

Consequently, the perpendicular concave portion 70 having the depth that reaches a halfway position of thickness of the first cladding layer 40 from an upper surface of the second cladding layer 44, is formed in the part of the optical waveguide L corresponding to the sidewall surface S2 of the groove portion 50 and its vicinity.

At this time, like the first embodiment, the metal layer 60 formed on the light path conversion inclined surface S1 of the groove portion is sealed with the second cladding layer 44. Accordingly, such a drawback can be overcome that either the cutting shavings adhere to the metal layer 60 (the light path conversion mirror) of the light path conversion inclined surface S1, or the metal layer 60 peels off or deforms.

As a result, the metal layer 60 left on the light path conversion inclined surface S1 of the groove portion 50 can be made to function as the light path conversion mirror M.

As depicted in FIG. 11A, like FIG. 6B of the first embodiment, the concave portion 70 formed in the optical waveguide L may be formed as the cavity. Otherwise, as depicted in FIG. 11B, like in FIG. 6C of the first embodiment, the embedded resin 46 may be formed to be embedded in the concave portion 70.

According to the above method, as depicted in FIG. 12, the light path conversion mirror M which is inclined to intersect with the extending direction of the core layer 42 (the light propagation direction) at a predetermined angle (preferably, 45°) is formed on both end sides of the optical waveguide L formed on the wiring substrate 10, respectively.

Accordingly, an optical waveguide device 2 of the second embodiment is obtained.

In the optical waveguide device 2 of the second embodiment, as depicted in FIG. 12, the optical waveguide L including such a structure in which the core layer 42 is surrounded by the first cladding layer 40 and the second cladding layer 44 is formed on the wiring substrate 10 explained in FIG. 3A of the above first embodiment.

Then, the light path conversion inclined surface S1 is provided in the thickness direction on both end sides of the optical waveguide L respectively. In the second embodiment, in both end sides of the optical waveguide L, the light path conversion inclined surface S1 is provided in the part from an upper surface of the core layer 42 to a halfway position of thickness of the first cladding layer 40 respectively. Then, the light path conversion mirror M formed of the metal layer 60 having light reflectivity is formed on the light path conversion inclined surface S1 on both sides respectively.

The second cladding layer 44 is formed on the core layer 42 so as to bury the light path conversion mirror M. The concave portion 70 having a depth that reaches a halfway position of thickness of the first cladding layer 40 from an upper surface of the second cladding layer 44 is formed in the vicinity of the inner side of the light path conversion mirror M on both sides respectively.

The outer side surface (the side surface of the light path conversion mirror formation side) of the concave portion 70 on both sides is arranged in a state that the inner end part (the end part positioned on the light propagation side) of the light path conversion mirror M is exposed from the first cladding layer 40.

As described above, the concave portion 70 is formed when the unnecessary metal layer 60 formed on the sidewall surface S2 of the groove portion 50 is removed.

In this manner, the light path is converted at 90° by the light path conversion mirror M which is arranged on both end sides of the core layer 42.

The method of manufacturing the optical waveguide device of the second embodiment can achieve the similar advantages to those of the first embodiment. In addition to this, in the second embodiment, after the first cladding layer 40 and the core layer 42 are formed, the groove portion 50 and the metal layer 60 are formed, and then the unnecessary metal layer 60 formed on the sidewall surface S2 of the groove portion 50 is removed in a state that the metal layer 60 is sealed with the second cladding layer 44.

Accordingly, the second cladding layer 44 can also serve as the protection insulating layer 34 in the first embodiment, and thus the protection insulating layer can be omitted herein. Therefore, a lower cost in comparison with the first embodiment can be attained.

Then, as depicted in FIG. 13, like FIG. 8 in the first embodiment, the connection terminals 80b of the light emitting element 80 are connected to the connection pads P of the optical waveguide device 2 on one end side and then mounted thereon, and also the light emitting portion 80a is optically coupled to one end side of the optical waveguide L by the light path conversion mirror M.

Then, the connection terminals 82b of the light receiving element 82 are connected to the connection pads P of the optical waveguide device 2 on the other end side and then mounted thereon, and also the light receiving portion 82a is optically coupled to the other end side of the optical waveguide L by the light path conversion mirror M.

Also, as depicted in FIG. 14, like FIG. 9 in the first embodiment, the underfill resin 84 may be filled into the clearances located under the light emitting element 80 and the light receiving element and the concave portions 70 of the optical waveguide L.

Also, after the embedded resin 46 may be embedded in the concave portions 70 of the optical waveguide L (FIG. 11B), the light emitting element 80 and the light receiving element 82 may be mounted, and then the underfill resin 84 may be filled as the need arises.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relates to a showing of the superiority and interiority of the invention. Although the embodiments of the present invention have been described in detail, it should be understood that the various changes, substitutions, and alterations could be made hereto without departing from the spirit and scope of the invention.

What is claimed is:

1. A method of manufacturing an optical waveguide device, comprising:
    obtaining an optical waveguide by forming sequentially a first cladding layer, a core layer, and a second cladding layer on a substrate;
    forming a groove portion including a light path conversion inclined surface and a sidewall surface which intersects with the light path conversion inclined surface, and the groove portion dividing the second cladding layer and the core layer, on both end sides of the optical waveguide respectively;
    forming selectively a metal layer on the light path conversion inclined surface and the sidewall surface of the groove portion;
    forming a protection insulating layer sealing the metal layer on the optical waveguide; and
    obtaining a light path conversion mirror that the metal layer is formed on the light path conversion inclined surface, by forming a concave portion which penetrates the core layer from the protection insulating layer to remove the metal layer formed on the sidewall surface of the groove portion, wherein the light path conversion mirror is covered with the protection insulating layer, and a processed surface of the light path conversion mirror is exposed in a sidewall of the concave portion.

2. A method of manufacturing an optical waveguide device, comprising:
    obtaining a laminated body by forming sequentially a first cladding layer and a core layer on a substrate;
    forming a groove portion including a light path conversion inclined surface and a sidewall surface which intersects with the light path conversion inclined surface, and the groove portion dividing the core layer, on both end sides of the laminated body respectively;
    forming selectively a metal layer on the light path conversion inclined surface and the sidewall surface of the groove portion;
    obtaining an optical waveguide by forming the second cladding layer sealing the metal layer on the laminated body; and
    obtaining a light path conversion mirror that the metal layer is formed on the light path conversion inclined surface, by forming a concave portion which penetrates the core layer from the second cladding layer to remove the metal layer formed on the sidewall surface of the groove portion, wherein the light path conversion mirror is covered with the second cladding layer and a processed surface of the light path conversion mirror is exposed in a sidewall of the concave portion.

3. A method of manufacturing an optical waveguide device, according to claim 1, after the obtaining of the light path conversion mirror, further comprising:
    embedding an embedded resin in the concave portion.

4. A method of manufacturing an optical waveguide device, according to claim 1, after the obtaining of the light path conversion mirror, further comprising:
    mounting a light emitting element on the substrate such that the light emitting element is optically coupled to one end side of the optical waveguide by the light path conversion mirror, and mounting a light receiving element on the substrate such that the light receiving element is optically coupled to other end side of the optical waveguide by the light path conversion mirror.

5. A method of manufacturing an optical waveguide device, according to claim 4, after the mounting of the light emitting element and the light receiving element, further comprising:
    filling an underfill resin into clearances under the light emitting element and the light receiving element, and simultaneously embedding the concave portion with the underfill resin.

6. An optical waveguide device, comprising:
    a substrate;
    an optical waveguide in which a first cladding layer, a core layer, and a second cladding layer are laminated sequentially on the substrate;
    a light path conversion mirror provided oppositely such that the light path conversion mirror makes a predetermined angle to a light propagation direction of the optical waveguide;
    a protection insulating layer formed on the optical waveguide and the light path conversion mirror; and
    a concave portion provided to penetrate the core layer from the protection insulating layer, such that an end portion of the light path conversion mirror is exposed from the first cladding layer in the concave portion, wherein the light path conversion mirror is covered with the protection insulating layer, and a processed surface of the light path conversion mirror is exposed on a sidewall of the concave portion.

7. An optical waveguide device according to claim 6, wherein the concave portion is formed as a cavity, or an embedded resin is embedded in the concave portion.

8. An optical waveguide device according to claim 6, further comprising:
    a light emitting element mounted on the substrate in a state that the light emitting element is optically coupled to one end side of the optical waveguide by the light path conversion mirror;
    a light receiving element mounted on the substrate in a state that the light receiving element is optically coupled to other end side of the optical waveguide by the light path conversion mirror; and
    an underfill resin filled in clearances under the light emitting element and the light receiving element and the concave portion.

9. An optical waveguide device, comprising:
    a substrate;
    a first cladding layer and a core layer which are laminated sequentially on the substrate;
    a light path conversion mirror provided oppositely such that the light path conversion mirror makes a predetermined angle to a light propagation direction of the core layer;
    a second cladding layer formed on the core layer and on a mirror face of the light path conversion mirror; and
    a concave portion whose side wall stands vertically, provided to penetrate the second cladding layer and the core layer, wherein an end portion of the light path conversion mirror is exposed from the side wall in the concave portion.

10. A method of manufacturing an optical waveguide device, according to claim 1, wherein in the sidewall of the concave portion, the processed surface of the light path conversion mirror and the protection insulating layer constitute an identical surface.

11. A method of manufacturing an optical waveguide device, according to claim 2, wherein in the sidewall of the concave portion, the processed surface of the light path conversion mirror and the second cladding layer constitute an identical surface.

12. An optical waveguide device, according to claim 6, wherein in the sidewall of the concave portion, the processed surface of the light path conversion mirror and the protection insulating layer constitute an identical surface.

13. An optical waveguide device, according to claim 9, wherein in the sidewall of the concave portion, the processed surface of the light path conversion mirror and the second cladding layer constitute an identical surface.

* * * * *